United States Patent
Omann

(10) Patent No.: US 6,588,973 B1
(45) Date of Patent: Jul. 8, 2003

(54) PAVEMENT METHOD AND COMPOSITION WITH REDUCED ASPHALT ROOFING WASTE

(76) Inventor: James S. Omann, 11235 Park Dr., Rogers, MN (US) 55374

( * ) Notice: Subject to any disclaimer, the term of this patent is extended or adjusted under 35 U.S.C. 154(b) by 0 days.

(21) Appl. No.: 09/723,943

(22) Filed: Nov. 28, 2000

Related U.S. Application Data

(63) Continuation of application No. 09/072,190, filed on May 4, 1998, now Pat. No. 6,186,700, which is a continuation of application No. 08/341,689, filed on Nov. 17, 1994, now abandoned.

(51) Int. Cl.⁷ ................................................. E01C 7/00
(52) U.S. Cl. ..................................... 404/17; 428/903.3
(58) Field of Search .............................. 404/17, 44, 71, 404/75; 516/38, 52; 106/269, 273.1, 276, 277, 279, 282; 428/489, 903.3

(56) References Cited

U.S. PATENT DOCUMENTS

| | | |
|---|---|---|
| 2,105,759 A | 1/1938 | Stevenson |
| 2,141,662 A | 12/1938 | Ossing et al. |
| 2,217,118 A | 10/1940 | Jesson et al. |
| 2,309,036 A | 1/1943 | Beardsley |
| 2,394,760 A | 2/1946 | Felton |
| 3,011,220 A | 12/1961 | Keller et al. |
| 3,682,396 A | 8/1972 | Whitney et al. |
| 3,887,141 A | 6/1975 | Francis |
| 4,215,949 A | 8/1980 | Gabriel, Jr. |
| 4,222,851 A | 9/1980 | Good et al. |
| 4,226,552 A | 10/1980 | Moench |
| 4,236,675 A | 12/1980 | Bladykas |
| 4,238,241 A | 12/1980 | Schneider |
| 4,252,487 A | 2/1981 | Jeppson |
| 4,269,693 A | 5/1981 | Hastie |
| 4,319,856 A | 3/1982 | Jeppson |
| 4,373,961 A | 2/1983 | Stone |
| 4,504,149 A | 3/1985 | Mendehall |
| 4,511,284 A | 4/1985 | Sterner |
| 4,549,834 A | 10/1985 | Allen |
| 4,619,550 A | 10/1986 | Jeppson |
| 4,706,893 A | 11/1987 | Brock |
| 4,726,846 A | 2/1988 | Jackson et al. |

(List continued on next page.)

FOREIGN PATENT DOCUMENTS

SU    1599086    10/1990

*Primary Examiner*—Gary S. Hartmann
(74) *Attorney, Agent, or Firm*—Gerald E. Helget; Nelson R. Capes; Briggs and Morgan

(57) ABSTRACT

A method of manufacturing and applying a novel pavement and patch material for roadways, driveways, walkways, patch for potholes and like surfaces, including the steps of reducing recycled asphalt roof waste to granules, adding aggregate and other solid recyclable materials to the granules, adding rejuvenating oil, adding emulsifier, adding asphalt concrete oil, adding anti-strip additives, adding liquid silicone, mixing the composition, heating the composition, applying the composition to the roadway or the like and compacting a new paving material.

9 Claims, 5 Drawing Sheets

U.S. PATENT DOCUMENTS

| | | | |
|---|---|---|---|
| 4,744,693 A | 5/1988 | Smith | |
| 4,756,484 A | 7/1988 | Bechler et al. | |
| 4,808,421 A | 2/1989 | Mendenhall et al. | |
| 5,017,230 A | 5/1991 | Hopkins et al. | |
| 5,061,500 A | 10/1991 | Mendenhall et al. | |
| 5,098,025 A | 3/1992 | Drouin et al. | |
| 5,173,115 A * | 12/1992 | Glynn, Jr. et al. | 106/281.1 |
| 5,201,472 A | 4/1993 | Brock | |
| 5,217,530 A | 6/1993 | Grzybowski | |
| 5,223,032 A * | 6/1993 | Gaudio et al. | 106/282 |
| 5,236,497 A | 8/1993 | Grzybowski | |
| 5,242,493 A * | 9/1993 | Glynn, Jr. et al. | 106/277 |
| 5,262,240 A | 11/1993 | Dunning et al. | |
| 5,337,965 A * | 8/1994 | Chiovitti | 241/19 |
| 5,340,391 A | 8/1994 | Grzybowski | |
| 5,344,485 A | 9/1994 | Glynn, Jr. | |
| 5,348,418 A | 9/1994 | Campbell | |
| 5,378,079 A | 1/1995 | Omann | |
| 5,385,426 A | 1/1995 | Omann | |
| 5,386,947 A | 2/1995 | Omann | |
| 5,397,389 A * | 3/1995 | Glynn, Jr. | 106/281.1 |
| 5,451,003 A | 9/1995 | Omann | |
| 5,511,899 A * | 4/1996 | Pavelek, II | 404/31 |

* cited by examiner

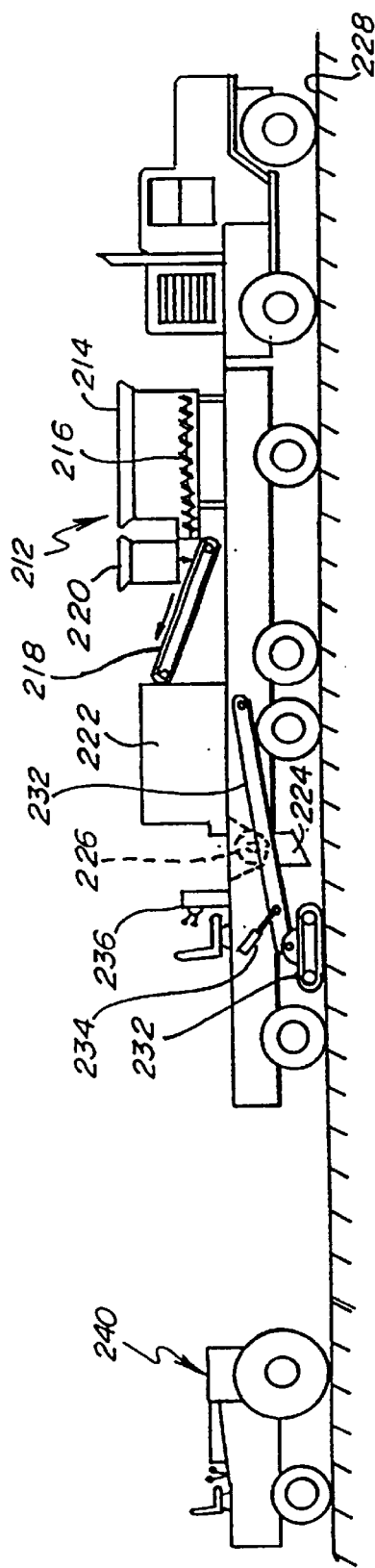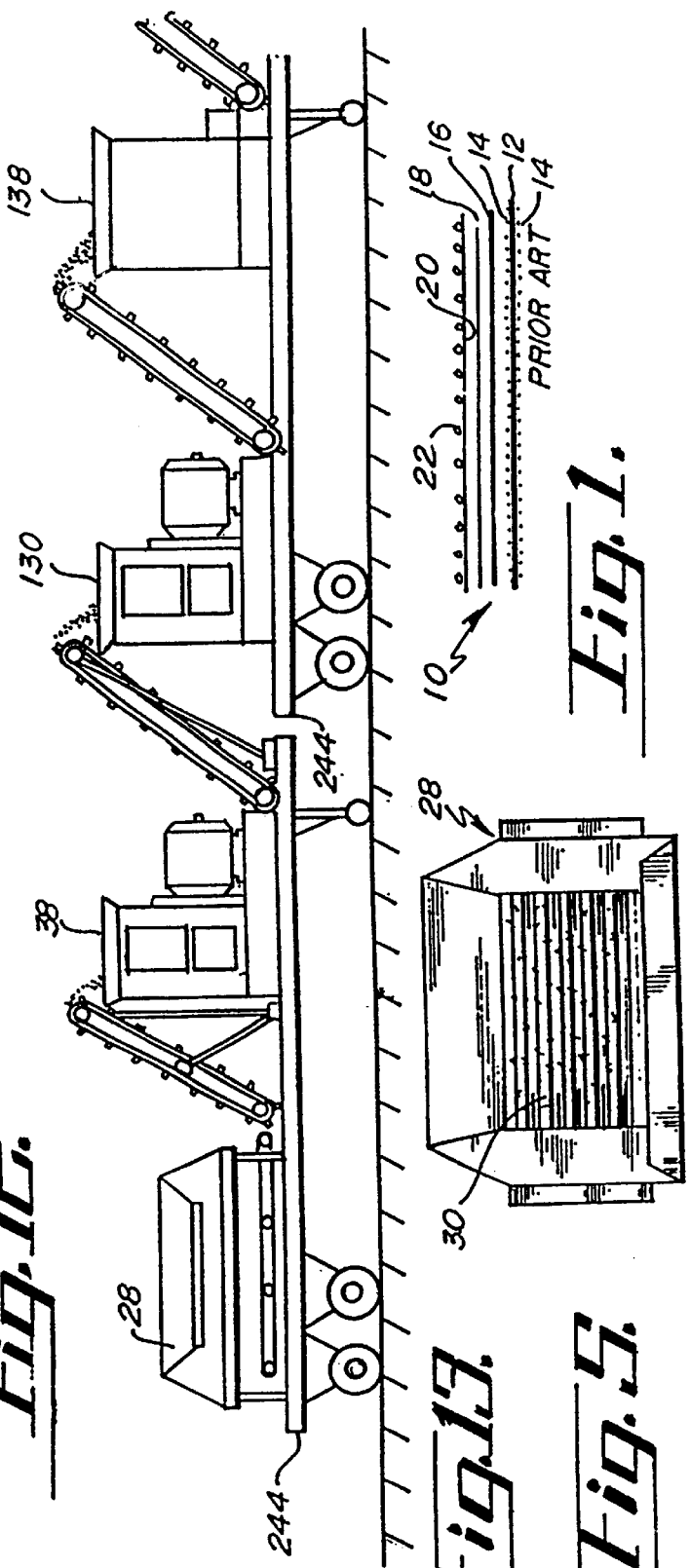

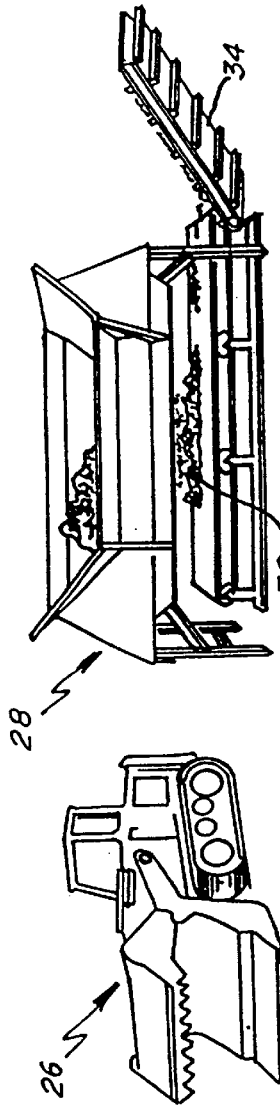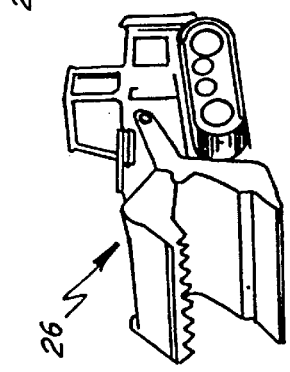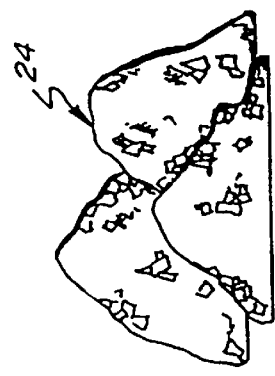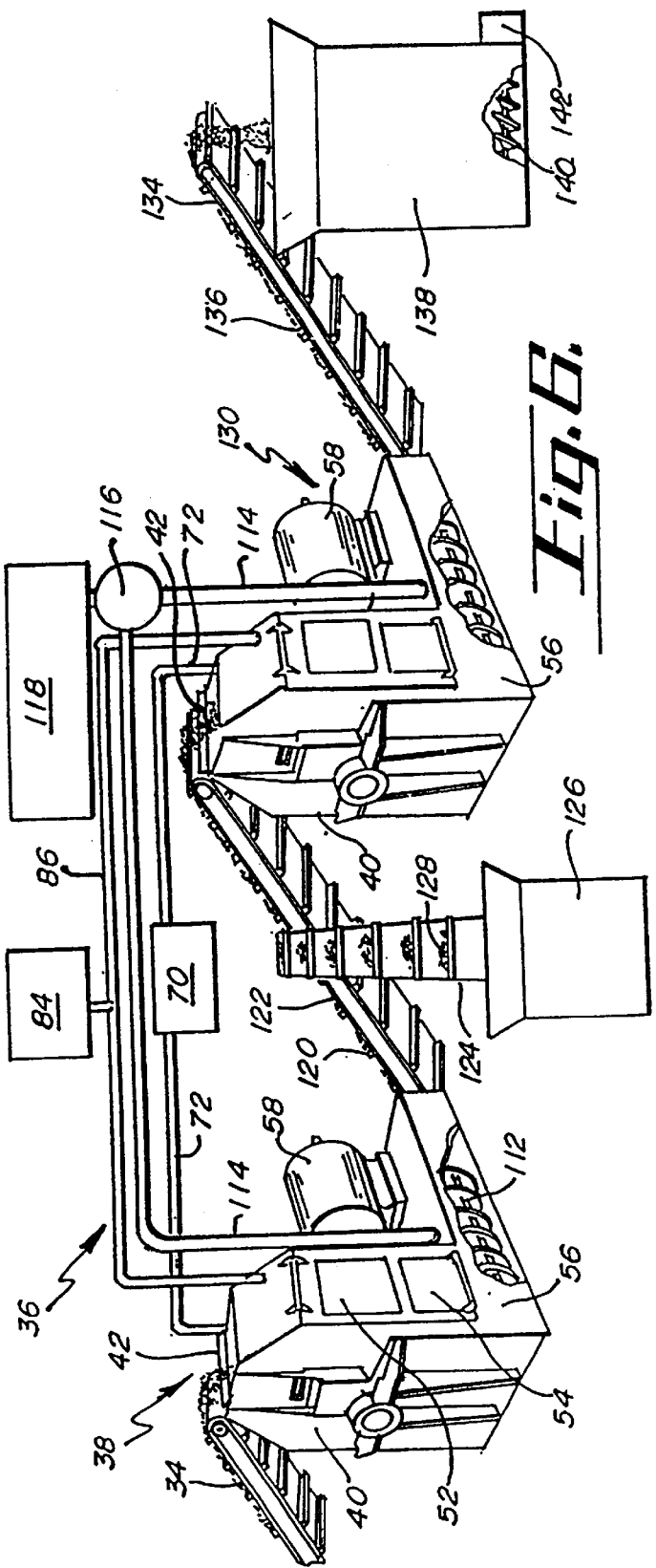

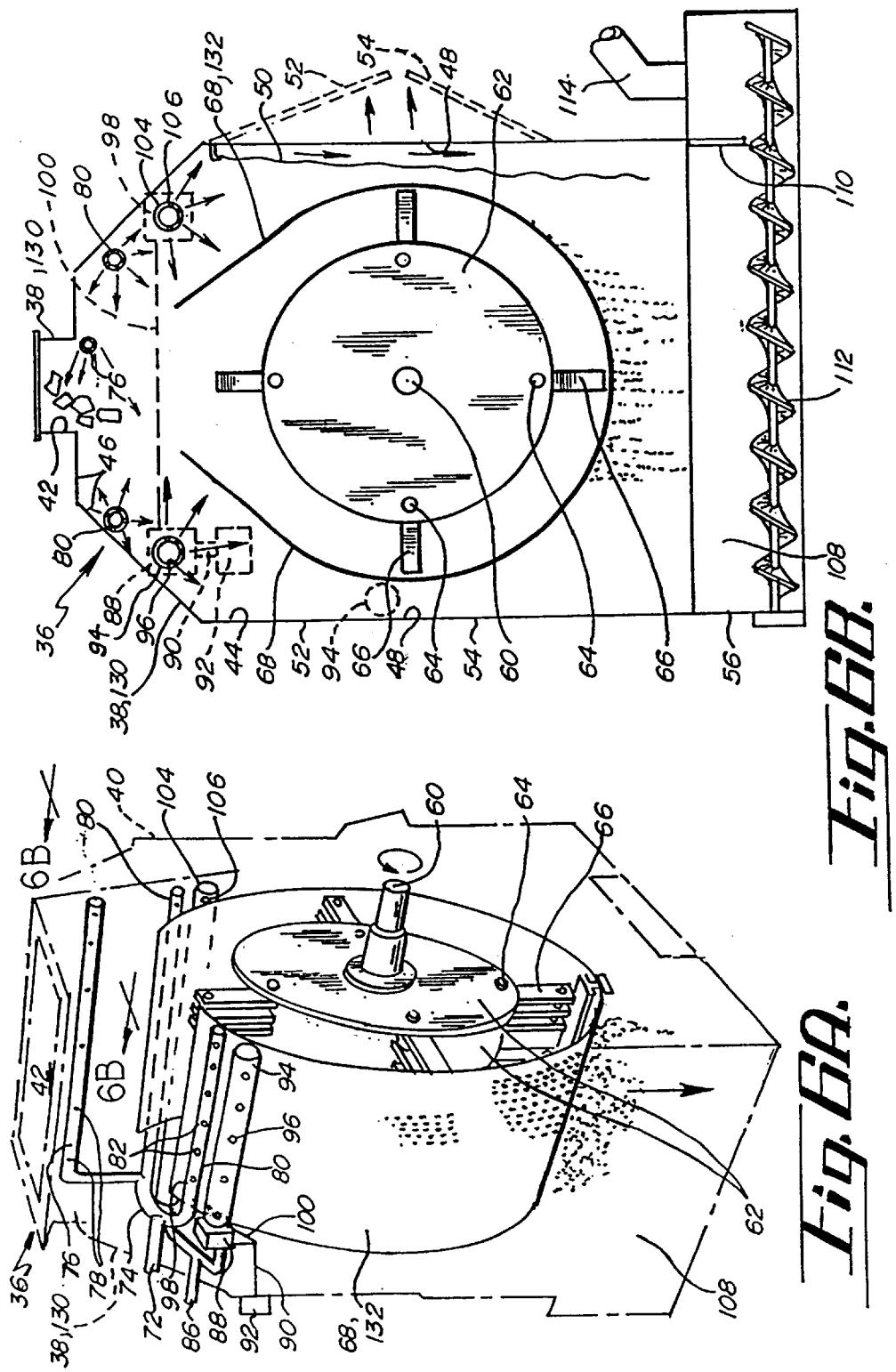

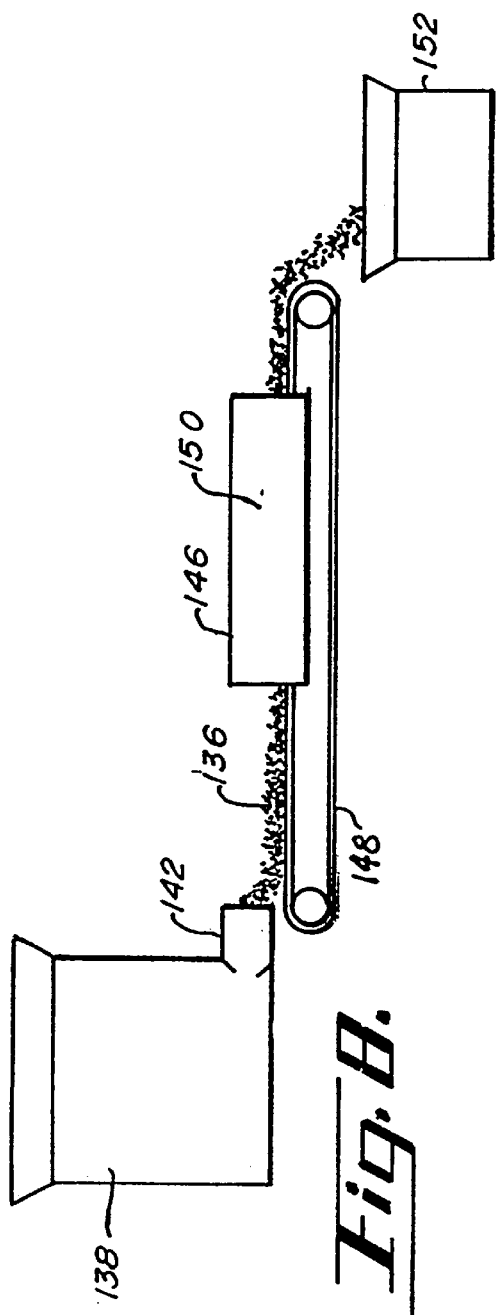
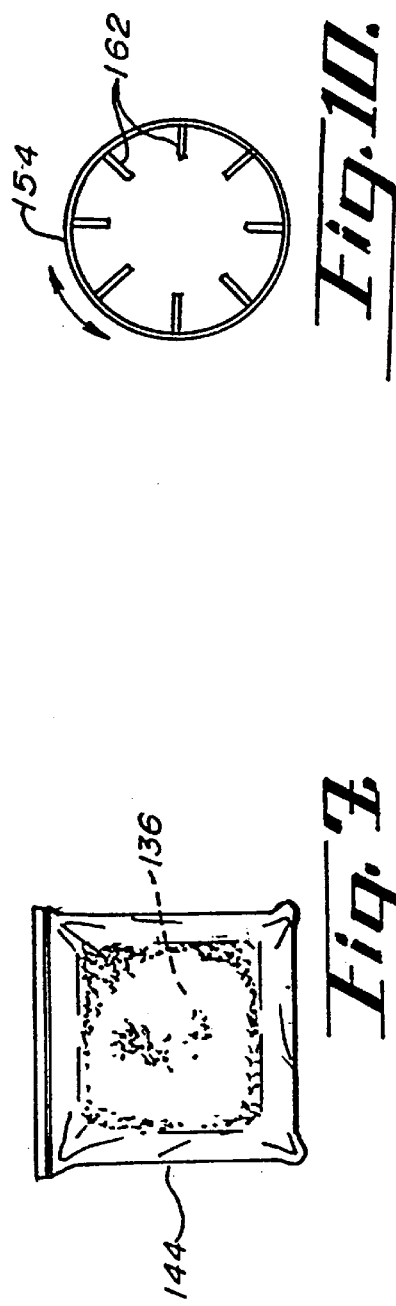
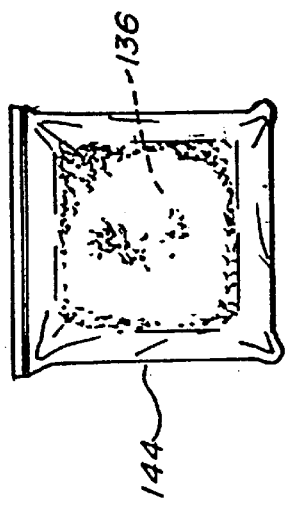

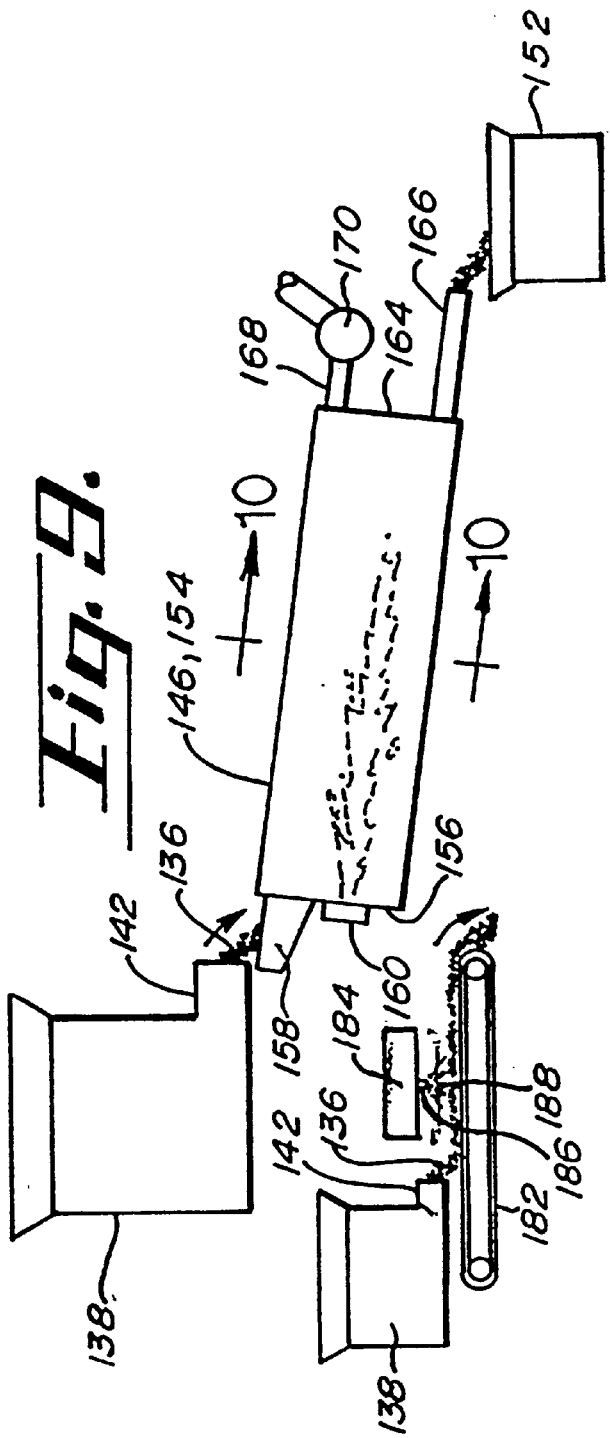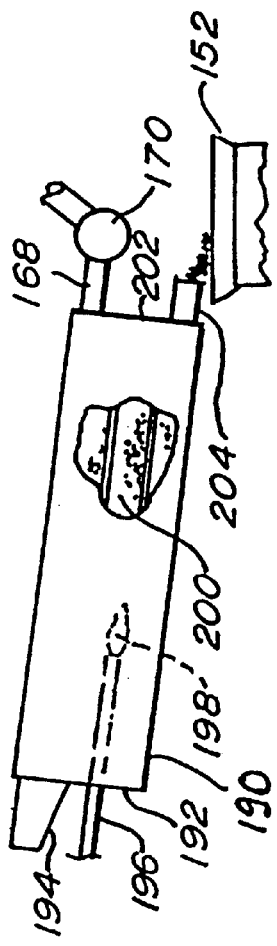

PAVEMENT METHOD AND COMPOSITION WITH REDUCED ASPHALT ROOFING WASTE

This application is a continuation under 37 CFR 1.53(b) of application Ser. No. 09/072,190, filed May 4, 1998, now U.S. Pat. No. 6,186,700, which is a continuation under 37 CFR 1.53(b) of abandoned application Ser. No. 08/341,689, filed Nov. 17, 1994 now abandoned.

BACKGROUND OF THE INVENTION

This invention generally relates to the recycling and use of roofing waste, including shingles, tar paper and portions thereof, and more specifically to composition, method and use of reduced roofing waste materials as a patch for potholes and a paving for roads, driveways, walkways and the like.

Methods and apparatus for manufacturing asphalt paving compositions for roadways and the like are well known. Virgin aggregate is utilized, which is largely comprised of crushed rock, small rock, and sand generally one inch in diameter and down to a sieve size of 200. Three quarter inch in diameter is often preferable. Typically, virgin aggregate is heated between 220° to 350° F. and dried in a rotating drum. Asphalt or asphalt-concrete oil is utilized with various penetration numbers ranging from 85 to 150, and which is also heated to a range of 280° to 350° F. The heated aggregate is then mixed with liquid asphalt in a proportion typically of five to six percent asphalt by weight. The paving composition is then hauled with trucks to the job site and dumped into a paving vehicle. The paver lays the hot mix out level to a desired thickness on top of a graded gravel surface of a suitable evaluation and smoothness. Thereafter the new pavement is compacted with a roller to the desired density.

Commercial asphalt paving composition plants have a variety of problems. Asphalt plants are complex in that they require scales, tumble dryers, conveyors, furnaces, mixers, huge tanks for heating oil and asphalt oil and complex pollution control systems for controlling dust and emissions. Consequently, asphalt plants are stationary and not easily movable.

Roofing materials, including shingles, tar paper and portions thereof, also utilize asphalt. The asphalt is commonly an asphalt-concrete oil (AC Oil) which is heavy and tar-like. FIG. 1 schematically shows in cross section the composition of shingles 10. Shingles 10 begin with a mat 12 which may either be fiberglass or of a paper felt-like material. Initially the mat 12 is soaked with a light saturine oil 14. Thereafter, a layer of asphalt-concrete oil 16 is applied thereto. Next a layer of lime dust 18 is placed or dusted thereon. Another layer of AC Oil 20 is applied afterwhich a rock layer 22 is applied. Thereafter, the entire composition is run through rollers.

Considerable roof waste (RARW—Recycled Asphalt Roofing Waste) is associated with the manufacture of new shingles, which may approximate one hundred million squares annually. A square is one hundred square feet of shingles. Each shingle has three tabs cut out. Each cutout tab measures one-quarter inch by five inches. The three discarded tabs represent approximately two and a half percent of each new shingle which is discarded. When old shingles and tar paper are removed from old construction, the one to three layers of shingles are all considered waste and are to be disposed of. Thus old shingle materials, also RARW, represent an even larger amount of waste associated with shingle materials.

Methods and apparatus have been disclosed by which old shingles and shingle material have been attempted to be recycled, such as those shown in U.S. Pat. Nos. 4,222,851; 4,706,893; 4,726,846; 5,201,472; 5,217,530; and 5,236,497. Illustratively, the '893 patent shows a method and apparatus wherein recycled shingles may be used in an asphalt plant mixed with heated and dried aggregate and liquid asphalt to form an asphalt paving composition. However, these prior methods of creating pavements and apparati have not been commercially successful for various reasons and especially due to their inability to create an acceptable pavement composition and to handle shingles without clogging or plugging up apparati.

More specifically, shingle materials by their very nature pose a complex problem in their reduction for recycling. The shingle materials, including the rock and asphalt oil in a range of twenty to thirty percent, are extremely heavy, sticky and abrasive. Efforts to reduce the shingle materials to particles and granules in hammermills have met with the clogging, plugging and sticking of the particles and granules within the hammermill, shutting down the production and necessitating maintenance and cleaning. Consequently, no one has reduced shingle materials to a small enough size that will permit their use alone or within an asphalt plant.

Prior art pavements utilizing RARW or Recycled Asphalt Roofing Waste are plagued with the two basic problems of air voids and stabilization. Air voids generally may be thought of as air pockets in the pavement. The air pockets must not be too tight or there will not be enough room to allow the pavement to move or slightly expand during freezing. If the air voids or air pockets are too loose, the pavement will be highly susceptible to water. Applicant has found that air voids in the range of two to eight percent are ideal and the prior art mixtures have had problems in attaining this acceptable range.

With respect to stabilization or firmness of the pavement material, the pavement material must not be too firm or it will not be workable in application as a pavement. Conversely, the material must have some degree of firmness or it will not set up for traffic use and will result in rutting. Applicant has found that a stabilimeter value of 800 to 3000 is acceptable and the prior art pavement mixtures and materials have had difficulty in consistently reaching this range.

The reason for the prior art mixtures and pavement materials' failure to meet acceptable ranges of air void and stabilization values is largely due to the many variables in making an acceptable paving composition with recycled roofing waste. The aggregate utilized is of a range of size from one inch to two hundred sieve size. The aggregate's porosity may also vary greatly. Furthermore, the aggregate may carry water for a significant amount of moisture into the mixture which causes problems. The condition of the RARW or shingle materials greatly affects the mixture. Older shingle materials commonly are oxidized and may have a significantly reduced AC oil content. Also, shingle materials may carry moisture, which also poses the problem described above. Some of these problems may be solved by conceivably superheating the mixture. However, equipment for superheating the mixture to a high enough temperature is not available at this time.

There is a need for a method of manufacturing and applying a new pavement and patch composition material for roadways, driveways, walkways, patches for potholes and cracks and the like wherein the composition may include recycled roofing waste (RARW), aggregate, rejuvenating oil, recycled asphalt pavement (RAP), RARW and RAP (RAM—Recycled Asphalt Mixture), and other reduced solid materials, emulsifiers, liquid silicone and anti-strip additives that have acceptable air voids and stabilization values without the need for a complex and polluting asphalt plant.

BRIEF DESCRIPTION OF THE DRAWINGS

FIG. 1 is a prior art composition schematic of shingle materials;

FIG. 2 is a front elevational view of a huge pile of waste and discarded shingle materials, tar paper and portions thereof;

FIG. 3 is a perspective view of a front end loader utilized in grasping and conveying the waste and discarded shingle materials;

FIG. 4 is a front elevational view of a material reduction apparatus or shredder with oscillating cutter bars utilized in reducing the shingle materials to pieces afterwhich the pieces fall upon a moving conveyor;

FIG. 5 is a top plan view of the shredder of FIG. 4 showing the oscillating cutter bars;

FIG. 6 is a side elevational view with schematics for the shingle reducing apparatus of the present invention;

FIG. 6A is a perspective view of the mill chamber of the hammermill with the housing in phantom outline;

FIG. 6B is a cross-sectional view of the hammermill taken along lines 6B—6B of FIG. 6A;

FIG. 7 is a front elevational view of reduced shingle materials packaged in a zip-lock type plastic bag;

FIG. 8 is a front elevational plan view of a method and apparatus for heating the reduced shingle granules;

FIG. 9 is a front elevational plan view of an alternative method and apparatus for heating the reduced shingle granules;

FIG. 10 is a cross sectional view taken along lines 10—10 of FIG. 9;

FIG. 11 is a front elevational plan view partially broken away of yet another alternative method and apparatus for softening the shingle granules;

FIG. 12 is a side elevational view of the invention in combination with a paver; and FIG. 13 is a side elevational view of the present invention mounted on trailers.

SUMMARY OF THE INVENTION

A method of manufacturing and applying a novel pavement and patch material for roadways, driveways, walkways, patch for potholes and like surfaces, including the steps of reducing recycled asphalt roof waste to granules, adding aggregate and other solid recyclable materials to the granules, adding rejuvenating oil, adding emulsifier, adding asphalt concrete oil, adding anti-strip additives, adding liquid silicone, mixing the composition, heating the composition, applying the composition to the roadway or the like and compacting a new paving material.

A principal object and advantage of the present invention is that it provides a method, apparatus and use for reduced shingle materials down to the granular level as heretofore not known for use as patching of cracks or potholes or paving for roadways, walkways, driveways and the like.

Another principal object and advantage is that the reduced shingle material pavement or patch material of the present invention may be heated and used as surfacing for roads as well as jogging, walking and running trails and tracks and as a patch without the need of additional asphalt or oil and may be used immediately after creation.

Another object and advantage is that rejuvenator oil may be added to the reduced shingle material for softening without heat for use as a paving material.

Another object and advantage of the present invention is that it permits the further combination of other recycled granular materials such as crushed and pulverized glass, recycled asphalt pavement (RAP), RAM (RARW and RAP), crushed and broken concrete, or shredded plastic tires, to be added thereto for use in creating a patch material or road paving material without the necessity of additional oils alone or combined in a conventional asphalt plant.

Another object and advantage of the present method is that it is significantly simpler than complex asphalt plants without the need for complex scales, tumble dryers, conveyors, furnaces, mixers, huge tanks for oils for both heating and asphalt oil and complex pollution control systems. The present apparatus is substantially pollution free and readily transportable.

Another object and advantage of the present invention is that the granular shingle material, when used as paving or patchwork, is less susceptible to frost or icing caused by the insulation qualities of the fibers of the shingles, making the surface safer for vehicle and human use in cold conditions.

Another object and advantage is that the present invention creates road surfacing materials for patching of potholes and paving of roadways from readily available shingles without the need for additional oils which is extremely cheap and which completely recycles existing waste materials without pollution.

Another object and advantage of the present method and pavement and patch composition is that it is of a significant acceptable air void percentage of two to eight percent with an acceptable stabilization stabilimeter value of eight hundred to three thousand.

Another object and advantage of the present invention is that the emulsifier additive assists in mixing the composition when there is water or a moisture content either in the recycled asphalt roofing waste or aggregate.

Another object and advantage of the present invention is that the liquid silicone additive assists the pavement and patch composition in paving as it smoothly comes out of the machine and assists in flowage of the composition.

Another object and advantage of the present invention is that the anti-strip additive assists in the coating of the aggregate.

Another object and advantage of the present invention is that both older and newer recycled asphalt roofing waste may be utilized in the method and composition.

Other objects and advantages will become apparent upon reading the following specification, claims and reviewing the appended drawings.

DETAILED SPECIFICATION

Referring to FIGS. 2 through 6B, the apparatus and method used for reducing shingle materials without the need of additional asphalt or the complexities of an asphalt plant may be seen. The discarded and roofing waste or shingles 24 heaped high in mountainous piles are loaded with a front end loader 26 into a material reduction apparatus 28 to create reduced shingle pieces 32. The shingle pieces 32 are then fed into the apparatus 36 comprising a first hammermill 38 and a second hammermill 130 together with the associated plumbing. The shredded shingle pieces 32 are reduced to shingle particles 120 and further into roofing waste granules 136.

FIGS. 7 through 11 show methods and apparati 146 for heating the reduced shingle granules 136 for use as a repair material or patch for potholes or as a paving for roadways. FIG. 12 shows a wheeled vehicle 212 adapted for carrying the reduced shingle granules 136, heating the granules and evenly applying the heated granules 136 to the road surface 228 afterwhich the new pavement may be compacted with a conventional roller 240. FIG. 13 shows the invention being mounted on transportable trailers 244.

Referring to FIGS. 4 and 5, the material reduction apparatus 28 may be seen. The apparatus 28 may also be referred to as a shredder with oscillating cutter bars 30 supporting knives. This shredding apparatus 28 is disclosed in allowed patent application Ser. No. 07/967,159 filed on Oct. 27, 1992 in the name of Applicant's brother, Lawrence F. Omann and issued under U.S. Pat. No. 5,340,038 on Aug. 23, 1994. The material reduction or shredding apparatus 28 reduces the large pieces and rolls of discarded and waste shingles 10 which have become compacted and stuck together as they lay within the huge shingle pile 24. The apparatus 28 reduces the shingles to pieces of a size on average of two to eight inches. As the shingle pieces 32 fall through the shredder 28, they land on a conveyor 34 which carries the shingle pieces 32 to the apparatus 36 which reduces the shingle pieces 32 to particles 120 and later to granules 136. It is also known that material grinders work well for material reduction as shown in U.S. Pat. No. 5,344,088 issued on Sep. 6, 1994 and marketed by Rexworks, Inc. of Milwaukee, Wis.

Referring to FIGS. 6, 6A and 6B, conveyor 34 leads to the first hammermill 38 which includes an upper housing 40 having a shingle flow inlet 42 for receiving the shingle pieces 32. Within the housing 40 is located a mill chamber 44 which has a ceiling 46 and an inner wall or walls 48. Optionally, a flexible fabric-like sheet 50 may be suspended along but spaced from the inner wall 48 as will be appreciated. Access into the mill chamber 44 is gained by the outward swinging of doors 52 and 54. The upper housing 40 is situated on a base 56 which appropriately supports a motor 58 which turns a shaft or rotor 60. A plurality of discs 62 are secured on to the rotor 60. The discs 62 are appropriately interconnected about their periphery by hammer pins 64 which support spaced apart reversible swinging hammers 66. About the discs 62 and hammers 66 spaced inwardly from the inner wall 48 is located a curved screen 68. The screen 68 in the first hammermill 38 appropriately may have apertures therethrough in the range of three to four inches illustratively.

A water source 70 is provided from which extends a water line 72 carrying twenty to thirty pounds per square inch of water. Naturally, the water is not used in extreme cold conditions. The water line 72 enters into the mill chamber 44 through upper housing 40 into a water manifold 74 which branches. Upwardly, is located a flow inlet water line 76 with nozzles or apertures 78 therein used for spraying the reduced shingle pieces 32 as they enter the first hammermill 38 to prevent sticking and to reduce or eliminate dust pollution. Mill chamber water lines 80 are generally located adjacent the ceiling 46 and inner walls 48 as they generally oppose each other and are located below and between the shingle flow inlet 42. The water lines 80 appropriately have nozzles 82 as to spray the mill chamber 44, ceiling 46, inner walls 48 and fabric sheet 50 (when used) with water as to discourage and reduce the sticking of shingle materials which otherwise may clog or plug the hammermill 38.

A compressed air source 84 is provided for supplying eighty to one hundred twenty pounds per square inch on average of compressed air. A compressed air line 86 extends from the source 84 to a first pulse valve 88 located suitably between the air line 86 and the compressed air manifold 94. The first pulse valve 88 may be of a diaphragm plug-type controlled by a solenoid. An electrical line 90 extends from valve 88 and is directed to a control box 92 which controls the first pulse valve 88 as to permit compressed air to intermittently enter the air manifold 94 every ten to fifteen seconds. The compressed air manifold appropriately may be approximately two inches and permits large volumes of compressed air to enter therein when the valve 88 is actuated. The manifold 94 has apertures 96 therein approximating one-half inch in diameter and in the range of six to thirteen apertures 96 in the manifold 94.

A second pulse valve 98 is also in line with compressed air line 86 at second compressed air manifold 104 and is controlled by electrical line 100 extending from control box 92. The second pulse valve 98 is similarly controlled as the first pulse valve 88, but to be actuated in an alternating fashion as to permit compressed air into the second compressed air manifold 104, which also has apertures 106 therein. The air manifolds 94 and 104 are substantially parallel to the rotor or shaft 60 and generally located adjacent the ceiling 46 and inner wall 48, as to discharge intermittently large amounts of compressed air which impinges on the mill chamber 44 surfaces, including the ceiling 46, inner wall 48, screen 68 and other components thereof. Additional manifolds 94 (shown in phantom outline) may be used within the mill chamber 44 and directed wherever the reduced shingle materials have a tendency to stick, clog or build up. Compressed air may also be directed between the inner wall 48 and the fabric-like sheet 50 on an alternating basis as shown by arrows. By this arrangement, the intermittent blast of compressed air shakes and ripples the fabric-like sheet 50 as to knock off any clinging or stuck reduced shingle materials which otherwise may cling to inner wall 48.

Below the mill chamber 44 is located a discharge chamber 108 which receives reduced shingle material particles 120 which have been pulverized by hammers 66 and pushed through screen 68. The discharge chamber 108 receives the reduced shingle material or particles 120 that are knocked off from the mill chamber ceiling 46, inner walls 48 and screen 68 by way of the intermittent compressed air blasts aided by the water. The discharge chamber 108 also suitably has a baffle 110 therein which assists in keeping the dust at low levels in extreme temperatures when water cannot be added to the hammermill 38. An auger 112 is suitably located in the base of discharge chamber 108 and draws the reduced shingle materials in the form of particles 120 from the hammermill 38. An exhaust duct 114 is appropriately located behind baffle 110 and appropriately has an in-line suction fan 116 in flow communication with a dust collector 118. The exhaust duct work 114 is appropriately actuated when water cannot be utilized as in cold weather and it is necessary to collect the dust and soot created by the hammermill 38 to prohibit pollution.

Shingle particles 120 exiting the first hammermill 38 are generally on average in a range between one-eighth inch to four inches. The particles 120 are drawn by auger 112 onto the second conveyor 122 which is then suitably fed into a second hammermill 130 for reducing the shingle particles 120 to granular shingle material 136 wherein sixty to eighty percent of the end product is powder and granules less than one-half inch in diameter and averaging one-eighth inch but no more than approximately one inch. A gradation test of the granular shingle material 136 produced the following summary:

| Sieve gradation | % of Shingle Granules 136 Passing |
|---|---|
| .375 | 100 |
| .187 (#4) | 74 |
| .0787 (#10) | 72 |
| .0331 (#20) | 51 |
| .0165 (#40) | 40 |
| .0070 (#80) | 28 |
| .0029 (#200) | 25 |

Optionally, a third conveyor 124 may lead from a storage bin 126 which appropriately holds shredded recycled asphalt pavement (RAP) or plastic tires, crushed glass, gravel, sand, crushed concrete or other shredded or granulated material 128 for addition onto the second conveyor to be mixed with the shingle particles 120 in the second hammermill 130. It has been found that there is adequate oil content within the shingles 10 as to permit the addition of these recyclable materials for use in patch or road paving.

The second hammermill 130 is essentially the same as the first hammermill 38 with one exception. That is, the three to four inch screen 68 is replaced in the second hammermill 130 with a screen 132 which has apertures therein in a range on average between seven-sixteenths and three-quarters of an inch. The exact aperture size of screens 68 and 132 are directly dependant upon the ambient air temperature and the speed of the rotor 60, discs 62 and hammers 66 which are generally in a range of twelve hundred to eighteen hundred r.p.m. Higher r.p.m.'s mean the screens may be of a larger diameter while the hammermill has better wear at lower r.p.m.'s.

The reduced granular material 136 is placed upon a third conveyor 134 from the second hammermill 130 and fed into a storage or surge bin 138 which appropriately may have an auger 148 in its base leading to a discharge outlet 142. The shingle granules 136 may be bagged or packaged suitably in ziplock like bags, paper bags or cardboard boxes as shown in FIG. 7 for home use in patching cracks or potholes in walkways, driveways and the like.

Testing has revealed that packaged granular shingle material 136 in plastic bags, paper bags with or without an inner layer or stain inhibitor film (popcorn bags), more rigid plastic containers or the like 144 will permit the consumer to heat relatively small amounts in a home microwave. For instance, three pounds of the granular material 136 may be heated in a fifteen hundred watt microwave for four to six minutes up to a temperature on average of two hundred degrees. Thereafter the sticky and soft granular shingle material 136 may be applied to cracks or potholes. A three pound package will do approximately a six inch square of approximately one and one-half inch compacted thickness.

Referring to FIG. 8, the larger scale or commercial application of heating the shingle granules 136 may be appreciated. Granules 136 are discharged from outlet 142 of storage bin 138 onto a conveyor belt 148 which passes through a microwave oven 150. Thereafter, the heated shingle granules 136 may be dumped into a hot storage bin 152 for use or transport to the location for use. Tests have revealed that a fifteen hundred watt microwave will heat approximately one pound of granules 136 to 250° F. in one and a half minutes.

Referring to FIG. 9, an alternative heating means for the shingle granules 136 is revealed. The granules 136 are again discharged from storage bin 138 into a tilted rotating cylindrical heater drum 154 having an open front 156 and a material receiving trough 158. A burner supplying hot air 160 is directed inwardly at the open front 156. As seen in FIG. 10, fins 162 are located within the drum 154 which aid in the tumbling and tossing of the shingle granules 136 during heating. The drum 154 has an open rear 164 and a dump shoot 166 for dumping the heated granules 136 into a hot storage bin 152. Again, an exhaust duct 168 having an in-line fan 170 may be utilized to reduce and prevent pollution to the ambient air or atmosphere by directing the exhaust to dust collector or scrubber 118.

Referring to FIG. 11, another alternative embodiment of heating the shingle granules 136 may be appreciated. The granules 136 are discharged from storage bin 138 onto a conveyor 182 above which is located a fuel source 184 having nozzles 186 therein. Fuel 188, such as gasoline, kerosine or fuel oil, is discharged from nozzles 186 onto the granules 136 and then dumped into a tilted, rotating cylindrical ignitor drum 190 having an open front 192 and a receiving trough 194. An ignitor 196 with a pilot 198 extends through the open front 192 into the rotating ignitor drum for igniting the fuel 188 and heating the granules 136. Fins 200 are also utilized in the ignitor drum 190 for mixing purposes. The drum 190 has an open rear 202 with a dump shoot 204 leading into a hot storage bin 152. The exhaust duct 168, fan 170 and collector scrubber 118 arrangement may also be used with this arrangement. Tests have revealed that five hundred pounds or one-quarter ton of granules would require approximately one gallon of fuel for this method of heating.

Referring to FIG. 12, a wheeled vehicle 212 may be seen which may be used as a paver for applying the heated granules 136. Vehicle 212 appropriately has a granular shingle material storage bin 214 with an auger 216 in its base. Auger 216 draws the granules 136 onto inclined conveyor 218 afterwhich the granules 136 optionally may be sprayed with fuel 220 depending on the appropriate heating means 222 as previously disclosed. The heated granules are then dumped into a trough 224 having an auger 226 for spreading the granules 136 in heated condition evenly upon roadway 228. Drag arms 230 extend backwards having a screed 232 at their ends with cylinders 234 adjustable for adjusting the pressure of screed 232. The control of the paving on vehicle 212 may be handled at a control center 236. After application, a conventional roller 240 may optionally compact the new pavement afterwhich it may immediately be driven upon or used by the public.

FIG. 13 illustrates the mounting of the shredder 28, first and second hammermills 38 and 130 and storage bin 138 on trailers 244 for transportation to the site for operation.

The shingle granules 136 may be softened for paving with the addition of a rejuvenator oil, gasoline, mineral spirits, flux oil, mist oil, used motor, hydraulic or heat exchanger oil, kerosine or fuel oil and tumbled in a rotating drum 154 or 190. After paving, the new pavement should be unused for a while to permit curing and evaporation of the rejuvenator oil.

Rejuvenating oil or the like has been found to be highly advantageous in softening up the asphaltic bituminous within the recycled asphalt roofing waste (RARW) recycled asphalt pavement (RAP), and in recycled asphaltic mixture (RAM), which is a blend RARW and RAP. Various petroleum products may be used as a rejuvenating oil to include fuel oil, kerosene, mineral spirits, gasoline, flux oil, mist oil, used motor, hydraulic or heat exchanger oil and the like. With the asphaltic bituminous or AC oil softened and somewhat liquified, the asphaltic oil will then more readily transfer to coat the aggregate.

As previously stated, aggregate can include sand and rock in the range of one inch down to a 200 sieve size with ¾ " being preferable. The aggregate can also include recycled asphalt pavement (RAP), crushed and broken concrete, crushed glass, as well as shredded tires and plastics.

Applicant has found that the moisture stored in the aggregate, recycled asphalt pavement and recycled asphalt roofing waste may be in the range but approximately near ten percent. What this means is that the rejuvenating oil may be rejected by the aggregate and roofing waste and have a tendency to bead off. Applicant has found that different types of emulsifiers generally work well to permit the petroleum products to blend and loosen up to coat the aggregate while yet handle any moisture content. Emulsifiers may be made by alkaline hydrolysis of esters (naturally occurring fats and oils), sometimes referred to as soaps. One ounce of emulsifier has been found to adequately treat one gallon of water or approximately eight pounds of moisture content. To increase the ratio or amount of emulsifier does not in any means damage the final pavement product.

The emulsifier is suitably premixed with the rejuvenating oil for ease of handling. An example for proportioning emulsifier RAP, RARW and rejuvenating oil is as follows:

EXAMPLE:

1 Ton Mixture

| RAP | 900 lb | 45% | at 10% moisture content |
|---|---|---|---|
| RARW | 900 lb | 45% | at 10% moisture content |
| RAM | 1800 lb | 90% | at 10% moisture content |

Or RAM could equal 1620 lbs of RAM plus 1801 lbs moisture content to equal 1800 lbs RAM.

| Emulsifier | 1.4 lbs | .07% |
|---|---|---|
| Rejuvenating oil | 198.6 lbs | 9.93% |
| | 2000 lbs | 100% |

Minimum requirement: 1 ounce emulsifier for 8 lbs moisture content.

180 lbs moisture content divided by 8 equals 22.5 ounces divided by 16 (16 ounces equals one pound).

Dividing 22.5 ounces by 16 equals 1.4 pounds.

| | | Rate |
|---|---|---|
| RATIO | RAP | 0%–95% |
| | RARW | 5%–95% |
| | Emulsifier | .01%–.3% |
| | Rejuvenating oil | 1%–10% |

Making a hot mix by using RARW and RAP (RAM) by mixing a desired amount using a microwave energy results in a 100% recycled hot mix. Range of heat should be 120 degrees to 350 degrees Fahrenheit, enough to soften the existing AC oil to create a binding effect when compacted. For example:

| RATIO: | RAP | 1%–95% |
|---|---|---|
| | RARW | 5%–99% |

By having two sources of asphaltic roof waste (RARW and RAP), the method saves time in mixing after being heated. This is because we do not need to transfer any of the asphaltic bitume oil from one asphaltic product to the other. RARW has a content of asphaltic bitume of a range of 20% to 50%, and RAP has a content of asphaltic bitume of a range of 3% to 8%. Also, RAP if processed down to a size of a courser aggregate (¼" to ¾"), will require less rejuvenating oil than if sized to a ¼" minus.

Collection of asphaltic roof waste for processing usually has three different types of asphaltic product. Some will be of the fiber glass asphaltic shingles, some will be of paper or felt asphaltic shingles and some will be from flat roofs or commercial buildings being made up of asphalt and rock. The proportioning with recycled asphalt roofing waste depends on if the product is from commercial flat roofs or shingles. The makeup of flat roofs is basically A.C. oil coated with a layer of rock, this would require a lesser amount of rejuvenating oil. If the product is organic or felt asphalt shingle material processed down to 1" minus it would take more rejuvenating oil than if processed down to ¼" minus. If the product is of a fiberglass shingle, again it is true the larger the size the more rejuvenating oil it will take but overall the organic or paper felt shingles size being of the same size as the fiber glass the fiberglass mixture will absorb or require less rejuvenating oil.

There may also be other miscellaneous debris when collecting asphaltic roof waste such as small amounts of wood waste, paper, plastics, metal, etc. Metal can be pulled out through the process with magnets but in most cases the rest of the debris can be processed down without any harm to the finished products. When processing RARW, the smaller the sizing the better the results or utilization of this product.

When storing RARW for any period of time before using, the product tends to stiffen or bond together, making it hard to handle, mix or blend to a desired application. By taking a selected amount of RAP, preferred size of ¾" minus, and blending the RAP with the final sized RARW suitably by conveying the RARW and RAP together by means of belt scales or other metering devices, the combination may be stockpiled. This will eliminate the problem of the RARW bonding together. These stockpiles can be blended for different applications. Storage piles can be made up of a blend for different applications such as cold mix, cold patch, hot recycle mix or a straight cold pavement application (straight cold pavement application is made without rejuvenating oil or solvents) in the following ranges:

| Range or proportioning | 15%–90% for RAP. |
|---|---|
| Range or proportioning | 20%–90% for RARW. |

By mixing RAP and RARW without rejuvenating oil or emulsifier, this product in hot climates and low traffic areas can be used as a cold pavement. By grading this product directly onto graveled roadways, parking areas, walkways, etc., at a desire thickness and compacted with conventional rollers, the ambient temperatures and direct sunlight will soften the asphalt oil in this product and create a bonding effect.

A liquid silicone or silicone emulsion will greatly assist in the new pavement mixture composition as it exits the pavement machine. The slippery quality attributable to the silicone will assist in keeping the asphalt flowing. Similarly, an anti-strip additive will also help in allowing the aggregate to be coated and act as surfactants to improve adhesion.

By using RARW, gravel and rejuvenating oil and mixing at ambient temperature, there remains a few problems. The amount of rejuvenating oil it takes to soften or activate the asphalt oil and the RARW to transfer to the gravel to coat the rock or granular material is fairly excessive which causes curing time or tenderness delay because of the excess rejuvenating oil. If too much rejuvenating oil is added, it will also lose its stabilization, making it an unusable end product for road use or a very limited one. The moisture content of the RARW and the gravel when adding the rejuvenating oil tends to repel the rejuvenating oil thus making it more difficult to transfer the asphaltic recycled oil from the RARW to coat the rock or granular material properly.

To correct the problem of getting the asphaltic oil in the RARW to transfer to the gravel with minimum rejuvenating oil would be to have the gravel and the RARW heated, which would soften the asphaltic oil in the RARW thus taking less rejuvenating oil to get the asphaltic oil to transfer to coat the gravel properly, and making it an instantly usable product for conventional means. Because of the lower amount of rejuvenating oil used, the tender or the curing time is lessened considerably to where it is very comparable to the standard hot mix. To solve any moisture problems in the composition, an emulsifier may have to be added to the rejuvenating oil. As long as the mixture (gravel and RARW) is higher than 120°, the amount of rejuvenating oil can be decreased than if it was mixed at ambient temperature. If the gravel mixture is heated together by conventional means or microwave energy, then the rejuvenating oil needs to be added to this process while mixing. The use of different types of rejuvenating oil is critical for different results of pavement mixture. For instance, the use of a light fuel, such as kerosene or #1 fuel, will evaporate quicker and be less tender, whereas a #5 heavy oil will stay tender longer (#1 fuel oil must be mixed at a lower mixing temperature than a #5 or heavier oil).

Problems exist when mixing both at ambient and heated temperatures. When mixing at ambient temperature, the given amount of rejuvenating oil it takes to transfer asphalt from the RARW to aggregate is too excessive to make a useable product for any road use because its stabilization is too low and the amount of curing time is too long. The heated process with aggregate and RARW with conventional means also has problems in transferring asphalt to aggregate, because of the amount of RARW needed in the final product. The RARW extracts too many BTU's from the hot aggregate mainly because of the moisture problems. Conventional asphalt plants today are not designed to heat hot enough to handle this product effectively without serious problems. If RARW was free of moisture and if asphalt plants could heat hot enough, there would still be problems with air voids and workability with the product.

All these problems can be eliminated by a new method of combining the two previous methods mentioned by treating the rejuvenating oil with additive such as emulsifier, silicone and anti-strip to create a uniform mix that meets air void and stabilization specifications, and has a workability comparable to conventional hot mix at a lower temperature of a range approximately 200°. This process can easily control air voids and stabilization by adjusting coarseness of aggregate or the amount of RARW or the amount of rejuvenating oil. Workability can be adjusted by the temperature of mixture, amount of RARW and amount of rejuvenating oil.

To treat the rejuvenating oil with silicone, calculate the percentage of the asphalt in the RARW to percentage used in RAM to percentage of rejuvenating oil used. One pint treats approximately 24 ton of asphalt content in RARW.

When processing of roof waste, the blending of the pile before processing and after, take the average AC content found in the pile after moisture content. If average AC is 20% out of 2000 lbs=400 lbs asphalt content. If too low it may need to increase the amount of RARW. If impossible to do so because of moisture or type of aggregate, then there may be a need to add virgin AC oil.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A hot mix pavement and patch material for roadways, driveways, and walkways from roof waste, comprising a mixture of 95 to 5 percent by weight recycled asphalt roof waste heated with 95 to 0.5 percent by weight aggregate, further comprising 1 to 10 percent by weight rejuvenating oil, and 0.01 to 0.3 percent by weight emulsifier.

2. The pavement and patch material of claim 1, further comprising less than six parts by weight non-emulsified asphalt concrete oil.

3. The pavement and patch material of claim 1, further comprising less than one part by weight anti-strip agent.

4. The pavement and patch material of claim 1, further comprising less than one part by weight liquid silicone.

5. The pavement and patch material of claim 1, wherein the rejuvenating oil is selected from the group consisting of fuel oil, kerosene, mineral spirits, gasoline, flux oil, mist oil, used motor oil, hydraulic oil, and heat exchanger oil.

6. A hot mix pavement and patch material for roadways, driveways, walkways from roof waste, comprising a mixture of 95 to 5 percent by weight recycled asphalt roof waste heated with 95 to 0.5 percent by weight aggregate, further comprising 1 to 10 percent by weight liquid, flowing rejuvenating oil, and further comprising 0.01 to 0.3 percent by weight emulsifier, wherein the rejuvenating oil is selected from the group consisting of fuel oil, kerosene, mineral spirits, gasoline, flux oil, mist oil, used motor oil, hydraulic oil, and heat exchanger oil.

7. The pavement and patch material of claim 6, further comprising less than one part by weight liquid silicone.

8. The pavement and patch material of claim 6, further comprising less than six parts by weight non-emulsified asphalt concrete oil.

9. The pavement and patch material of claim 6, further comprising less than one part by weight anti-strip agent.

* * * * *